INVENTORS
JOSEPH M. TYRNER
BY NELSON E. ANDERSON
ATTORNEYS

Patented Aug. 8, 1950

2,517,739

UNITED STATES PATENT OFFICE 2,517,739

ELECTRIC ARC WELDING SYSTEM

Joseph M. Tyrner, New York, N. Y., and Nelson E. Anderson, Scotch Plains, N. J., assignors to Air Reduction Company, Incorporated, a corporation of New York Application March 2, 1948, Serial No. 12,636

1 Claim. (Cl. 219—8)

This invention relates to electric arc welding systems of the type in which a water-cooled arc welding torch is employed.

In one such welding system the welding torch has a non-consuming electrode, usually tungsten, between which and the work an arc is struck, the arc and weld puddle being protected by an inert gas shield. Because of the intense heat and high welding current the welding torch must be water-cooled. When welding with alternating current a high frequency arc stabilizing voltage is frequently used in addition to the welding current. For manual welding, it is essential that the operator be able to effect all the necessary controls from his welding position, such as the supplies of welding current and high frequency arc-stabilizing voltage and the supply of arc-shielding gas and cooling water. Preferably it should be possible for the operator to control these things from one or more control devices on the welding torch itself, but the torch must be kept small, light and simple, and the lead cable to the welding torch must be light and flexible, and therefore the means adopted to make it possible for the operator to effect the controls from some device on the welding torch must not negative these desirable conditions.

The principal object of this invention is to provide an arc welding system of the type that has a water-cooled welding torch, in which not only the flow of the cooling water but the supply of welding current to the torch, and the supply of any other medium utilized at the torch, may be controlled from a simple water-control valve located on or near the torch.

Another object is to provide, in an arc welding apparatus of the kind that includes a water-cooled welding torch, a control system for the welding current and cooling water and any other medium utilized at the torch, that makes a complex lead cable unnecessary, thereby permitting the use of a light flexible cable.

According to the invention a flow responsive switch is connected in one of the cooling water conduits leading to or from the welding torch so as to be responsive to the flow of the water in the cooling system, and this switch operates when the operator starts or stops the flow of cooling water by opening or closing a water-control valve on or near the welding torch. The flow responsive switch has a pair of contacts which control the energizing circuit of an electric relay which has any desired number of pairs of contacts which control the supplies of the various mediums utilized at the welding torch, such as the welding current, the high frequency arc-stabilizing voltage, and the arc shielding gas. The arrangement is such that when the operator closes the water-control valve at or near the welding torch to turn off the flow of cooling water, the flow responsive switch operates automatically to effect actuation of the relay and its contacts in such a way as to shut off the welding current and the other mediums that are controlled by the relay contacts, and when the operator opens the water-control valve to turn on the flow of cooling water the flow responsive switch operates automatically to effect actuation of the relay and its contacts in such a way as to turn on the welding current and the other mediums controlled by the relay contacts. The flow responsive switch and all of the instrumentalities that are needed to control the supplies of the various mediums to the welding torch, except the water-control valve, may be located at a stationary part of the welding system, and are nevertheless automatically operated by the simple act of opening or closing the water-control valve located at or near the welding torch where it can be conveniently manipulated by the operator.

An arc welding system embodying the invention is illustrated in the accompanying drawings, in which.

Figure 1:
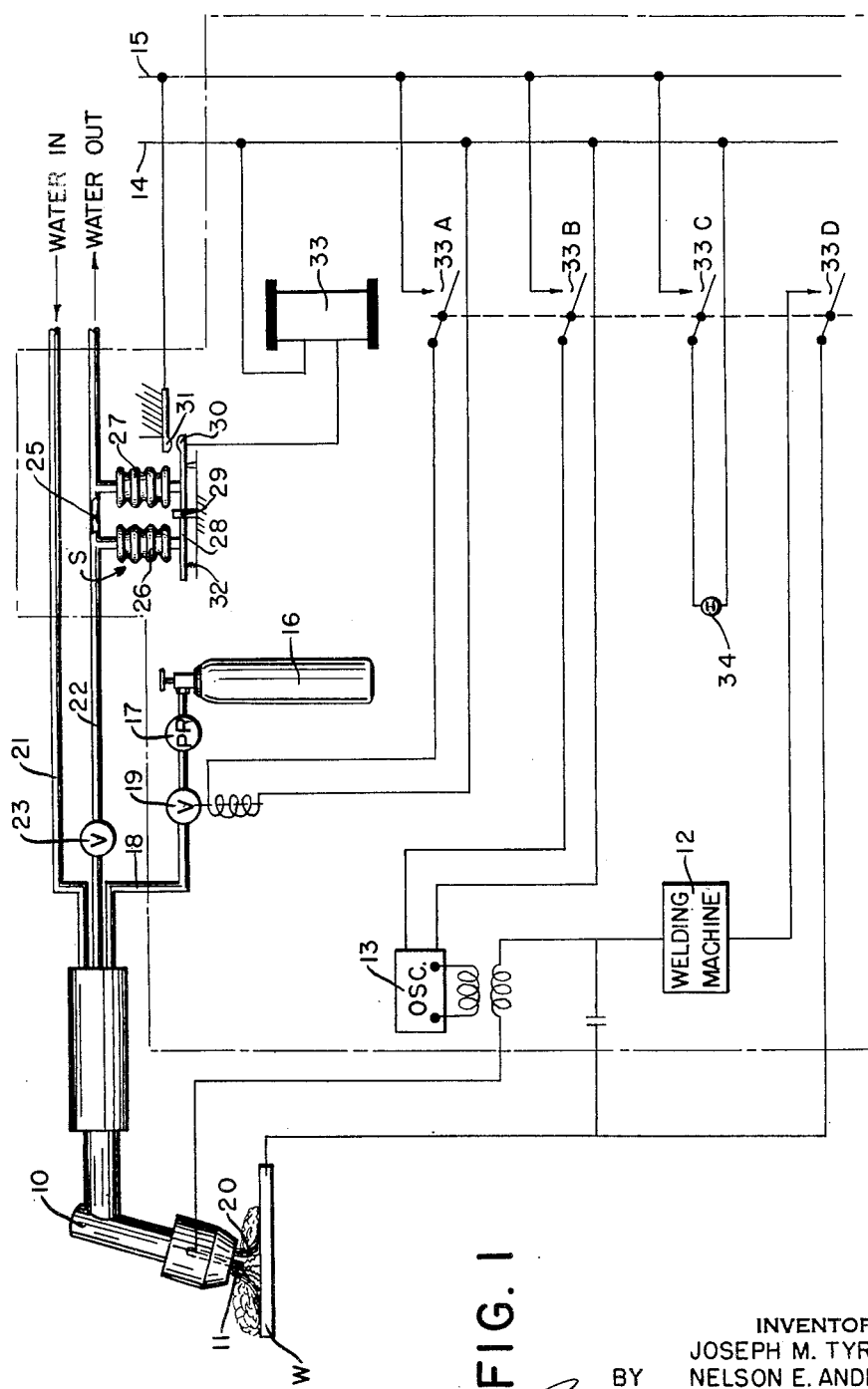
Figure 1 is a schematic representation of the system.

Referring first to Fig. 1, a suitable electric welding torch or electrode holder 10 grips an electrode 11 in welding relation to a work-piece W. The electrode and the work-piece form part of a conventional welding circuit energized from a welding machine 12 which may be a transformer or a welding generator. A high frequency oscillator 13 is coupled to the welding circuit to stabilize the arc. This oscillator is energized from electrical supply lines 14 and 15. Inert shielding gas, such as helium or argon, is supplied to the welding torch from a cylinder 16 through a pressure regulator 17 and a gas supply tube 18. A solenoid valve 19, energized from the electrical supply lines 14 and 15, controls the flow of shielding gas through the tube 18. The gas delivered to the welding torch by the tube 18 issues from the torch and provides a gas shield for the welding arc as represented at 20. Cooling water is circulated through the welding torch by a supply tube 21 and a return tube 22. A manually operated water-control valve 23, mounted in either water line on or near the welding torch, regulates the flow of the cooling water. The valve 23 preferably forms part of the cooling water passages of the welding torch itself.

The above-mentioned cooling-water flow responsive switch is schematically shown at S in Fig. 1. This switch includes a restriction 25, such as an orifice of reduced diameter, in one of the water lines, with pressure responsive devices tapped into the line on opposite sides of the restriction, such as bellows 26 and 27. These bellows work against a balanced lever 28 which pivots on a fixed pivot 29. An electric contact 30 on the end of lever 28 cooperates with a fixed electric contact 31 forming part of an electrical circuit. A light compression spring 32 biases the lever so the contacts are normally separated or open. If the bellows are sufficiently resilient, this spring may be eliminated. When there is no cooling water flow through the orifice 25, the pressure is the same on both sides of the orifice—therefore the same in bellows 26 and 27. This holds the lever in the position in which the contacts are open. When cooling water flows there is a pressure drop across the orifice 25 resulting in a greater pressure in bellows 26 than in bellows 27. This results in unbalance of the lever 28 bringing contact 30 against contact 31. As soon as the flow of water ceases, the pressure in the bellows is equalized and the lever returns to its open-contact position under the influence of spring 32.

Any suitable flow responsive switch can be substituted for the one described above, but in any case the contacts 30 and 31, or their equivalents, form part of a relay circuit in which a relay 33 is energized from the supply lines 14 and 15 through the flow switch contacts. The relay 33 has a number of pairs of contacts 33A, 33B, 33C and 33D. The closing of contacts 33A, when the relay is energized, puts the solenoid valve 19 across the supply lines 14 and 15, thereby opening the solenoid valve and admitting shielding gas to the welding torch. Similarly, the closing of contacts 33B upon energization of the relay energizes the high frequency arc-stabilizing oscillator 13. The closing of contacts 33D upon energization of the relay completes the welding circuit to the electrode. Contacts 33C put an electric socket 34 across the supply lines 14 and 15 when relay 33 is energized. The reason for providing this socket will be mentioned later.

Figure 2:
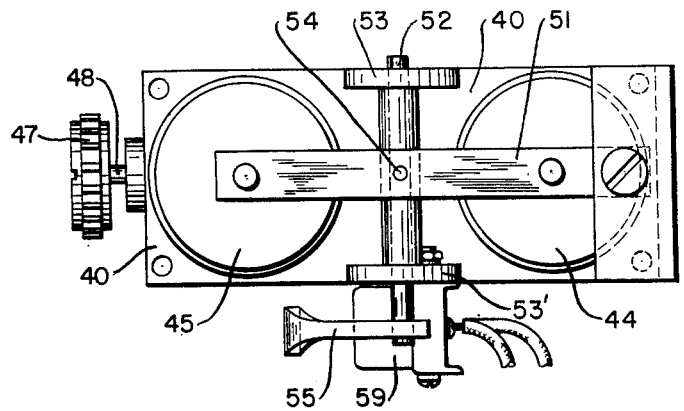
Fig. 2 is a plan view of the flow responsive switch.
Figure 3:
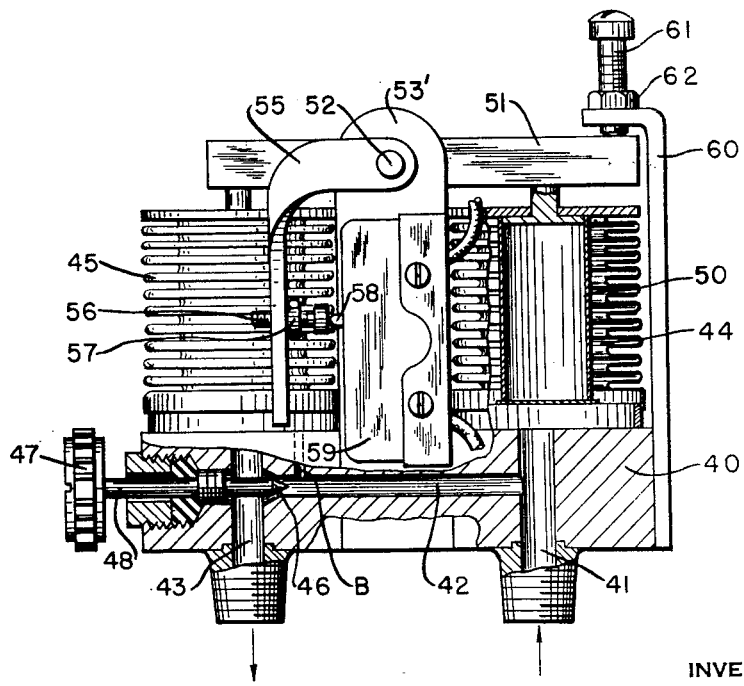
Fig. 3 is a side elevation of the switch of Fig. 2, some parts being shown in section.

Figs. 2 and 3 illustrate a type of commercially practical flow responsive switch that can be used for the switch schematically represented at S in Fig. 1. A base 40 has drilled therein three communicating passages 41, 42 and 43 (Fig. 3). Passage 41 admits the cooling water to the switch and to a bellows 44 mounted on the base 40. Passage 42 extends from inlet passage 41 to passage 43 which is the outlet passage. Outlet passage 43 communicates at one end with a second bellows 45 mounted on the base 40. The passage 42 which connects the inlet and outlet passages contains the flow restriction. The flow restriction comprises a needle valve 46 which is adjustable from a handle 47, attached to valve stem 48, projecting from the body 40 through conventional packing. A by-pass passage B prevents circulation from being completely stopped even if the valve 46 is closed. Although not essential, it is preferable to reduce the volume of the bellows by placing a body 50 within the bellows.

The closed ends of the bellows work against a lever 51 which is pivoted at a point midway between the points at which the pressure is applied to the lever by the bellows. The pivot is a shaft 52 supported by bearings in brackets 53 and 53' (Fig. 2) which are secured to the base 40. The lever 51 is secured to the shaft 52 by a pin 54. A bent arm 55 is secured to the shaft 52 outside of bracket 53'. A tapped hole in the arm 55 receives a screw 56 (Fig. 3) which may be adjustably positioned in the tapped hole and which may be locked at the selected position by a lock nut 57. The screw contacts the plunger 58 of a microswitch 59 of conventional design which is mounted on the side of bracket 53'. A stop screw bracket 60 secured to the base 40, supports an adjustable stop screw 61 which is retained in place by a lock nut 62. This stop screw limits the travel of the lever 51 and thereby prevents overtravel of the arm 55.

The operation of the flow responsive switch described above is as follows. The cooling water enters the switch through passage 41, flows through the restrictive needle valve 46 and out through passage 43. When no water is flowing, there is no pressure drop across the restriction, the pressures in the two bellows are equal, and the lever 51 is balanced. When sufficient water flows through the switch, there is a pressure difference between the upstream and downstream sides of the restriction, resulting in a different pressure acting on each bellows, bellows 44 overbalancing bellows 45 such that the lever 51 comes to rest against stop screw 61 and the plunger 58 of microswitch 59 is depressed. When the flow of water is interrupted by intentionally turning it off or accidentally as by a broken connection or an obstruction in the system, the pressure drop across the needle valve disappears and the pressure in the two bellows is equalized again, removing the pressure from microswitch plunger 58 which returns to its normal undepressed position. The purpose of using an adjustable needle valve as the flow restriction is to permit the switch to respond to various fluid flows.

All the elements of the welding system enclosed by the broken line in Fig. 1 may be built into the stationary part of the system, thus minimizing the number of parts and controls that must be handled by the operator.

It will now be seen that the operation of the entire welding system is controlled by the flow of cooling water which in turn is controlled by a simple valve at the welding torch. When the operator opens the water-control valve the supplies of welding current and high frequency arc stabilizing voltage, as well as the supply of shielding gas, are turned on, and when the operator closes the water-control valve the supplies of all of these things are shut off. It is preferable to use a time delay element in connection with the shielding gas solenoid valve 19 to permit gas to flow for a short time after the welding arc is interrupted, thereby protecting the hot electrode from the oxidizing effect of the air.

The control of the various mediums delivered to the welding torch by operation of a water-control valve at the torch makes possible a simple lead cable carrying only the welding current, the shielding gas and the cooling water. The cable may therefore be made light and flexible. In addition, since the welding current is automatically shut off when the cooling water stops flowing, the control system acts as a safety device to prevent destructive overheating of the welding torch or the lead cable should the circulation of cooling water fail for any reason.

While the invention has been described as if a full opening and full closing of the water-control valve is necessary to turn on or off the various mediums delivered to the welding torch, it is evident that the flow responsive switch can be designed and adjusted, if so desired, to turn on the supply of the mediums before the valve is fully open and to turn them off before the valve is fully closed. Therefore, in the accompanying claims wherever reference is made to operation of the flow responsive switch in response to increase in flow of the cooling water to a certain value or in response to decrease in flow to a certain value, the "certain value" reached during increase of flow may be either full flow or some flow slightly less than full flow, and the "certain value" reached during decrease of flow may be either zero flow or a flow that is not reduced entirely to zero.

The invention probably is of greatest value when the welding torch 10 is a manual torch equipped with a water-control valve that also controls the other mediums in the manner above described, but it is also applicable to automatic arc welding systems in which a machine type welding torch is employed. In this case the electric socket 34 may be the power source for the motor that produces the relative movement between the welding torch and the work. Since this socket is in series with the relay contacts 33C, the operation of the motor that controls the relative movement between the torch and the work would be controlled from the water-control valve at the torch in the same manner as the welding and arc-stabilizing voltages and the shielding gas. Any other instrumentality which it may be desired to control from the water-control valve at the welding torch may be connected to the socket 34, or to an additional pair or relay contacts provided for the purpose.

The invention may be used, if desired, in any arc welding system having a water-cooled welding torch even though the only thing that needs to be or is desired to be controlled from the water-control valve is the welding current.

We claim:

An electric arc welding system comprising a manual water-cooled arc welding torch having a handle portion and an electrode, a water circulating system in which the welding torch is connected so as to be cooled by the water circulating in the system, a welding circuit for supplying welding current to the electrode and the work, a manually operable water-control valve carried by the handle portion of the welding torch for controlling the flow of cooling water in the water circulating system, a flow responsive switch connected in the water circulating system and having a pair of electric contacts, said flow responsive switch being responsive to the flow of water in the water circulating system so that it moves to one position when the operator closes the water-control valve sufficiently to reduce the flow of water in the water circulating system to a certain value and moves to a second position when the operator opens the water-control valve sufficiently to increase the flow of water in the water circulating system to a certain value, and an electric relay electrically connected to the contacts of the flow responsive switch so as to be controlled thereby, said relay having at least one pair of electric contacts adapted to be electrically connected to an instrumentality that is responsible for the supply of a medium to the welding torch.

JOSEPH M. TYRNER.
NELSON E. ANDERSON.

REFERENCES CITED

The following references are of record in the file of this patent:

UNITED STATES PATENTS

| Number | Name | Date |
|---|---|---|
| 1,577,489 | Peck | Mar. 23, 1926 |
| 1,643,929 | Marland | Sept. 27, 1927 |
| 2,091,219 | Sciaky | Aug. 24, 1937 |
| 2,258,835 | Williams | Oct. 14, 1941 |
| 2,373,041 | Martindell | Apr. 3, 1945 |
| 2,400,903 | Allen | May 28, 1946 |